H. J. LYMAN.
AUTOMATIC REGULATOR AND SAFETY APPLIANCE FOR THE CONTROL OF MOTOR VEHICLES.
APPLICATION FILED JUNE 30, 1914.
1,154,328.
Patented Sept. 21, 1915.
2 SHEETS—SHEET 1.
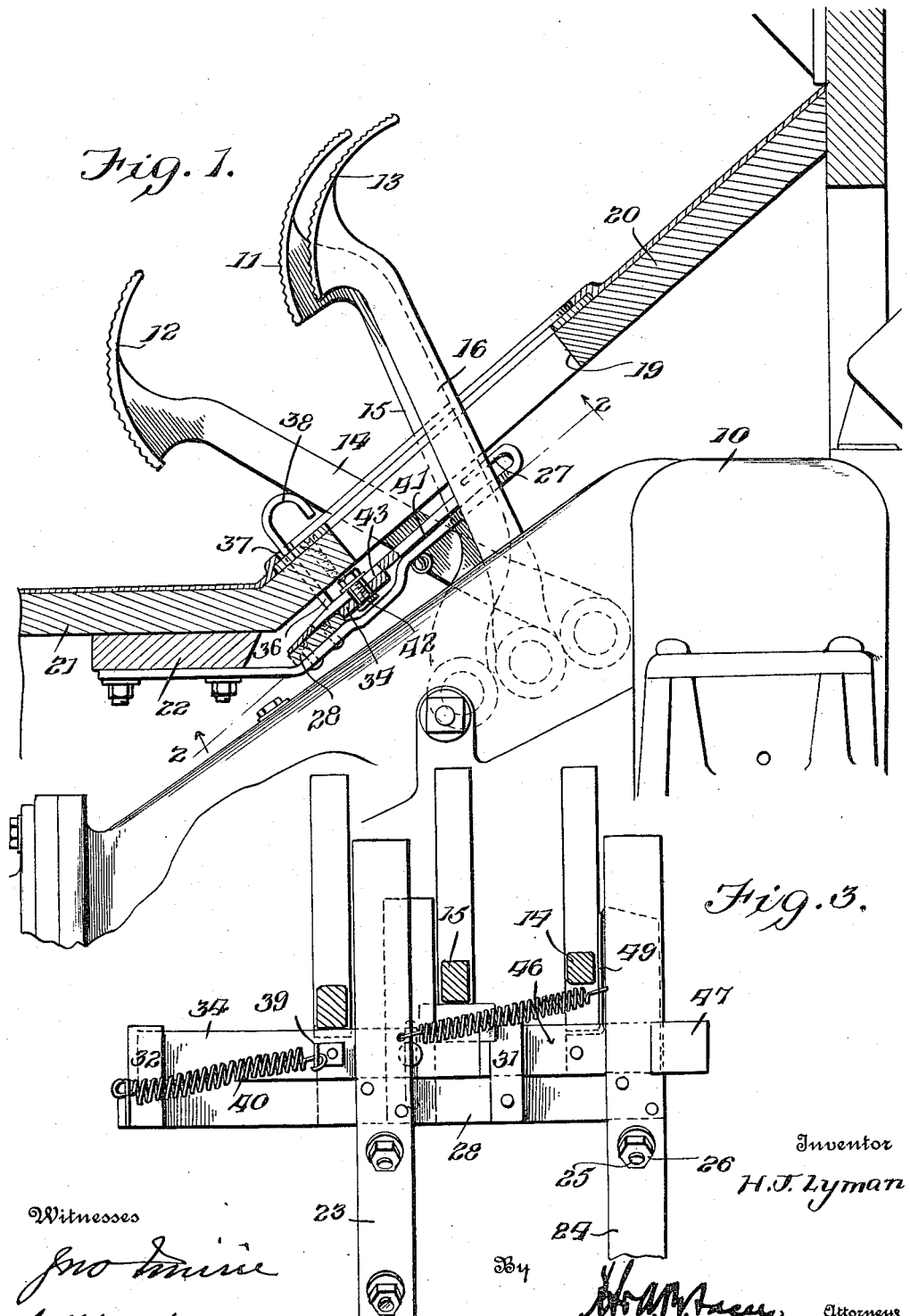

H. J. LYMAN.
AUTOMATIC REGULATOR AND SAFETY APPLIANCE FOR THE CONTROL OF MOTOR VEHICLES.
APPLICATION FILED JUNE 30, 1914.
1,154,328. Patented Sept. 21, 1915.
2 SHEETS—SHEET 2.
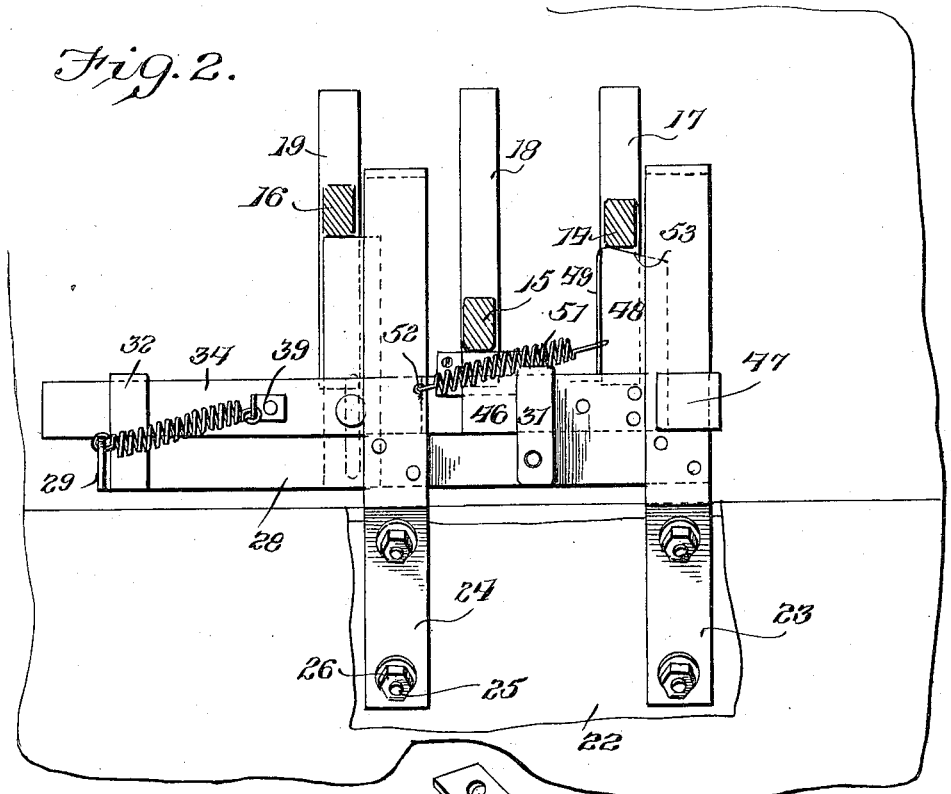
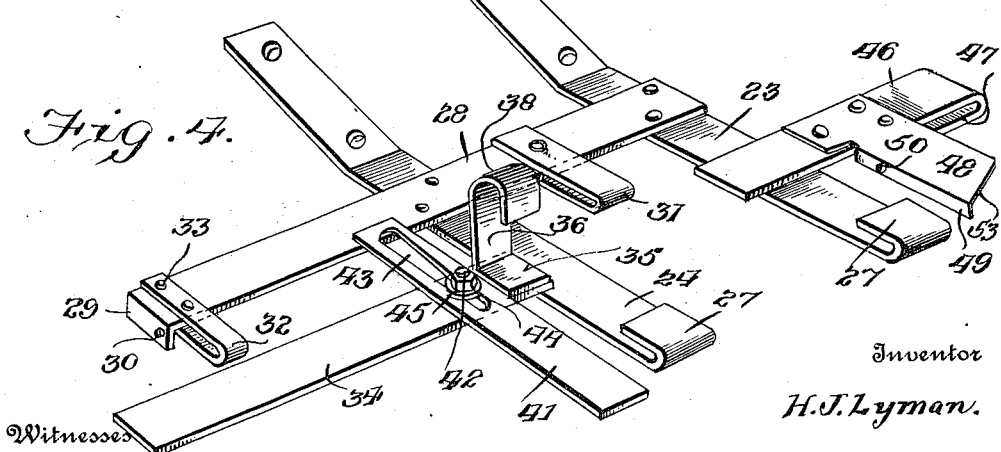

UNITED STATES PATENT OFFICE.

HENRY J. LYMAN, OF NEWFIELD, NEW JERSEY.

AUTOMATIC REGULATOR AND SAFETY APPLIANCE FOR THE CONTROL OF MOTOR-VEHICLES.

1,154,328.

Specification of Letters Patent.   Patented Sept. 21, 1915.

Application filed June 30, 1914.   Serial No. 848,293.

*To all whom it may concern:*

Be it known that I, HENRY J. LYMAN, citizen of the United States, residing at Newfield, in the county of Gloucester and State of New Jersey, have invented certain new and useful Improvements in Automatic Regulators and Safety Appliances for the Control of Motor-Vehicles, of which the following is a specification.

My invention relates to new and useful improvements in automatic regulators and safety appliances for motor vehicles, the primary object of my invention being the provision of a mechanism for automatically locking the clutch pedal and service brake pedal of motor vehicles in certain predetermined positions, to insure proper and safe driving of the vehicle.

More specifically, my invention is intended for use upon motor vehicles of the type in which the gear and clutch control, as well as the service brake are all operated by means of foot pedals, the transmission mechanism being usually of the planetary gear type and the clutch and service brake built in as part of the transmission, my invention, for this reason, being particularly applicable to vehicles having the well known Ford transmission or similar transmissions.

In the Ford type of transmission, as is generally known, one pedal controls the clutch and all forward speed drives of the transmission, another pedal controls the reverse speed drive of the transmission, and another the service brake, while a hand lever controls the emergency brake, which operates on the transmission, this hand lever also being connected to the transmission in such a way that at any setting between intermediate position and full application of the brakes, it throws out the clutch. That pedal which controls the forward speed drives of the vehicle, being commonly termed the "clutch pedal" inasmuch as it also operates the clutch, when in its middle position, holds the clutch out, this being the neutral position of the transmission. When such pedal is forced ahead to its full extent, the clutch is thrown in and the low speed gears are brought into action, while, on the other hand, release of the clutch pedal permitting it to swing to its extreme rearward position first throws out the clutch, then changes the gears to high speed position and then again throws in the clutch, giving the high speed drive of the transmission. Both the clutch pedal, reverse gear pedal and service brake pedal are normally held in extreme rearward position by means of springs, such position for the clutch pedal, as previously pointed out, being the high speed gear position of the transmission, while such positions of the reverse pedal and service brake pedal are their inactive positions. Under these circumstances, it is clear that before a car employing this type of transmission can be safely cranked, the clutch must be thrown out, as some gears are always in position, for which reason either the emergency hand brake must be moved to such a point as to throw out the clutch or the clutch pedal must be held in central position of its movement to accomplish the same results. Oftentimes, the driver fails to note the position of the emergency brake lever and cranks the car with both the clutch and gears in, the result either being the stalling of the engine or injury to the operator, due to starting of the vehicle. Again, it often happens that one person cranks the vehicle while another is holding the clutch pedal in neutral position, under which circumstances, if the foot of the person holding the clutch pedal in position slips, the engine will either be stalled or the person cranking injured. In addition to these facts it is well known that oftentimes, in case of extreme emergency, the operator, in a moment of excitement, because of the quick and excessive pressure which he is exerting against the service brake pedal, does not get his foot properly upon the pedal, with the result that it slips off and the brakes are immediately released, resulting in injury either to the car or to the traffic through which the car is passing.

My present invention aims to overcome the above mentioned difficulties, which were previously one of the chief defects of an otherwise extremely simple and effective form of control mechanism, by the provision of automatic locks for securing the clutch pedal in neutral position, preventing its return to high speed position and for securing the service brake pedal in its position of application.

In this connection, a still further object of my invention is to construct the two locks separate in such a manner that either one may operate independently of the other and to at the same time provide a single, foot controlled releasing device for releasing both pedals.

A yet further object of my invention consists in so constructing the locks and releasing device that the locks may be successively released, the lock of the brake pedal being the first released and the release of the clutch pedal requiring greater effort unless pressure is being applied to the clutch pedal during its release.

A still further object of my invention is to so mount the releasing member of the locks that it may be readily manipulated by the heel of that foot of the operator which, under ordinary running conditions, rests upon the service brake pedal, thereby avoiding what might be the necessity of the operator removing one or the other of his feet from either the clutch pedal or brake pedal when releasing such pedals.

A still further object of my invention is to provide an appliance of the above described nature which will be simple and economical in construction, durable and efficient in operation, and readily applicable to vehicles already in use.

With these and other objects in view, my invention will be more fully described, illustrated in the accompanying drawings, and then specifically pointed out in the claims which are attached to and form a part of this application.

In the drawings: Figure 1 is a fragmentary, longitudinal, central sectional view taken through that slot in the floor of a Ford motor car through which the service brake pedal projects, looking in the direction of the other pedals; Fig. 2 is a bottom plan view of the invention, the pedal shanks being shown in section on the line 2—2 of Fig. 1, both the clutch and service brake pedals being shown in locked position; Fig. 3 is a similar view, showing the normal position of all the pedals, when the locks are released; Fig. 4 is an unassembled perspective view of my appliance as it would appear before attachment to the vehicle, the springs which cause the automatic locking of the pedals being omitted from this figure.

Corresponding and like parts are referred to in the following description and indicated in all the views of the drawings by the same reference characters.

In order to insure a clear and accurate understanding of my invention, its manner of application to a vehicle, and its operation in use, I have illustrated it in connection with a transmission mechanism of the Ford type in which the transmission and clutch housing is conventionally shown at 10, the transmission, clutch and service or transmission brake being controlled by the clutch pedals 11, 12 and 13, the shank portions 14, 15 and 16 of which extend through the slots 17, 18 and 19, respectively, formed in the inclined foot board 20 of the vehicle, being operatively connected to the parts which they control in the usual or well known manner, which needs no description. It should be noted however, that normally all of these pedals are held in the rear portions of their respective slots by springs or other suitable means.

As will be seen from Fig. 1, the inclined foot board 20 forms, in effect, a continuation of the floor 21 of the vehicle body and such floor adjacent its juncture with the foot board is provided with a transversely extending spacer block 22 which forms a support for my attachment. My improved appliance is assembled upon and supported by a pair of spaced brackets 23 and 24, each in the form of a strip of metal of suitable weight and dimensions, these strips being secured to the lower face of the spaced block 22, in proper spaced relation, by bolts 25 and nuts 26, or other suitable fastening devices. The free ends of these brackets, which extend in parallel relation, are bent upwardly to also extend in parallel spaced relation beneath the lower face of the foot board 20, care being taken in the application of the appliance that they do not project in vertical alinement with any of the slots 17, 18 and 19. The extreme free ends of these brackets are rebent upwardly and rearwardly as shown at 27 to form keeper loops for the locking plates, as will be later explained. These brackets are connected, adjacent the spacer block 22, by a transversely extending guide brace 28, preferably in the form of a strip of metal secured by rivets or other suitable fastening means to the brackets, one end of the strip being secured to the bracket 23, which bracket is that located adjacent the clutch pedal, while the intermediate portion is secured to the other bracket, the free end portion extending considerably beyond such other bracket which is that located adjacent the service brake pedal 13, the extreme free end of this guide brace being bent down as shown at 29 and provided with a perforation 30, for a reason which will be later explained. The free ends of U-shaped guide members 31 and 32 straddle this guide brace, one being located between the brackets 23 and 24 and the other adjacent the down turned free end 29 of the guide strip, these guide loops being secured to the brace by rivets 33 or other suitable fastening means in such a manner that their bight portions extend at right angles to and in advance of the forward edge of the guide strip.

The above described structure constitutes the supporting frame or body of my appliance and I will now describe the specific construction of the locking mechanism carried by this frame, particular reference being had to Figs. 1 and 4 of the drawings. As previously mentioned, independent locks are employed, one for the clutch pedal and one for the service brake pedal. The locking means for the brake pedal includes a reciprocating carriage 34, one end of which is slidably mounted in the guide loop 32 and the other end of which carries a release member 35 in the form of an L-shaped body portion 36, one arm of which projects through a transverse slot 37 formed in the foot board 20 of the vehicle, said arm being curved forwardly and downwardly as shown at 38 in order that it may be readily engaged by the heel of the operator, such release member, as will be clearly understood from the drawings, being located immediately between the reverse and service brake pedals and at the rear thereof. An L-shaped bracket 39 is secured by one arm to the lower face of the carriage 34 at a point substantially midway of its length and has its other arm perforated to receive one hooked terminal of a helical spring 40, the other hooked terminal of which is passed through the perforation 30 of the downturned end of the guide brace 28, this spring serving, under normal conditions, to draw the carriage to the right of the vehicle. Secured to this carriage, adjacent the release member 35, is a locking plate 41 which projects at right angles to the carriage, its forward end terminating substantially midway of the length of the slot 19 through which the brake pedal shank 16 moves. For a reason which will be later explained, the locking plate 41 is secured to its carriage 34 by means of a bolt 42 passed through an opening formed in the carriage 34 and through a longitudinal slot 43 formed in the locking plate 41, this bolt being secured in place by a nut 44, a spring washer 45 being preferably interposed between the nut and locking plate 41.

As shown in Fig. 4, the locking plate 41 engages against one arm of the releasing member 35 and when secured in adjusted position is, therefore, held by such arm against any swinging movement. Because of the slot and bolt connection between the locking plate 41 and its carriage, it is possible to adjust the plate in such a manner that when it moves to extend in a position across the slot 19, as shown in Fig. 2 of the drawings, it may engage the pedal shank 16 of the service brake pedal at any desired point in its path of movement. Means is thus provided for regulating the force with which the service brake must be applied before it will be locked in applied position by the locking plate 41. The engagement of one edge of the locking plate 41 against the side of the brake pedal shank 16, when the latter is in neutral or inactive position, serves to normally hold such plate out of the way and to maintain the spring 40 under proper tension. The extent to which the locking plate 41 may move is limited by limiting the movement of the carriage 34 in order that the locking plate may never move beyond the slot 19, the movement of the carriage in turn being controlled by engagement of the arm 36 of the releasing member 35 against one end of the slot through which such arm moves.

The locking means for the clutch pedal 12 includes a second reciprocally mounted carriage 46, one end of which is slidably mounted in the guide loop and the other end of which is rebent as shown at 47 to embrace the bracket 23, one longitudinal edge of the carriage bearing against the forward edge of the guide brace 28. Mounted upon this carriage is the locking plate 48, having that longitudinal edge adjacent the slot 17 bent down to provide a stop flange 49 provided with a perforation 50. One hooked terminal of a helical spring 51 engages through this perforation of the stop flange and the other end engages through a perforation 52 formed in the intermediate portion of the supporting bracket 24, this spring tending to, at all times, draw the carriage to such a position as to bring the locking plate 48 across the lower portion of the slot 17 through which the shank of the service brake pedal 13 extends. At the same time, movement of the carriage in the opposite position is limited by engagement of the stop flange 49 against the inner edge of the bracket 23 as soon as the locking plate 48 has passed out of vertical alinement with the slot 17.

The springs 40 and 51 tend to draw the locking plates 41 and 48 from the left to the right and it will, therefore, be clear that when either the pedal shank 16 or the shank of the pedal 13 is swung forwardly beyond the advance edge of its locking plate, the locking plate will be moved by its spring across the slot in which the pedal shank moves to block its return movement until such locking plate is manually returned to position. It will further be seen that when the above named pedal shanks are at their rearmost position, which is ordinarily the normal position for foot pedals, the springs will hold the edges of the locking plates against the shanks in such a manner that the locking plates will be ready for immediate movement to locking position upon manipulation of the pedals.

Reference to Figs. 2 and 3 of the drawings will show that when both locks are released, or both in active position, the adjacent ends of their respective carriages are spaced a distance slightly greater than the amount of movement of the carriage 34 necessary to move the locking plate 41 to release position to free the pedal shank of the service brake pedal 13. With this in view, the manner in which the pedals 13 and 12 may be successively released by the releasing member 35 will be readily understood. Lateral pressure against the releasing member 35 will first move the carriage 34 in such a direction as to release the brake pedal 13, after which the pressure may be removed from the releasing member 35 and the clutch pedal 12 left locked. On the other hand, if desired, the releasing member may be still further pressed in the same direction, the result being that the inner end of the carriage 34 is brought into engagement with the adjacent end of the carriage 46, forcing such carriage laterally until its locking plate 49 is moved out of alinement with the slot 17 to release the clutch pedal. At this point it should be noted that that end of the locking plate 49 which extends in the path of the clutch pedal shank 14, is formed at an inclination as shown at 53 to form a cam face. Because of this, more pressure than ordinary is required to force the carriage 46 laterally to release the clutch pedal as such movement must, of necessity, force the clutch pedal somewhat ahead against the action of its spring. This insures against releasing of the clutch pedal by slight over pressure exerted against the releasing member when intending only to release the brake pedal. At this point it should be noted that, although not absolutely necessary, the slotted portion of the locking plate 41 is preferably tapered somewhat in thickness toward its rear end in order that the side thrust exerted against it by the brake pedal, as well as the direct rearward thrust exerted against it by the brake pedal when locked by it, will not be able to force it rearwardly and consequently out of adjustment. This tapering is clearly shown in Fig. 4 of the drawings.

In view of the foregoing description, in connection with the clear disclosure of my invention, as made by the drawings, any detailed description of its operation is believed to be unnecessary. Assuming that the appliance is attached to a Ford automobile, it will be clear that whenever the clutch pedal 12 is swung to middle of position or beyond such position, it will be automatically locked against return movement to rear or high speed position. As the clutch pedal is always swung to such position upon bringing the vehicle to a stop, it will be clear that no further operation is necessary to permit safe cranking of the engine, as is now the case. Furthermore, when operating the vehicle, assuming that the clutch pedal is locked in neutral position, it will be clear that the reverse pedal may be employed intermittently as many times as desired to back the automobile without the necessity of the operator's either maintaining his foot upon the clutch pedal to hold it in neutral position or moving the hand brake lever to such position as to lock the clutch in neutral position. Because of this fact, the operator can, when reversing the vehicle, keep one foot upon the reverse pedal and the other upon the service brake pedal which is of great importance when going down steep grades and about similar places. It will further be clear that so long as the clutch pedal and brake pedal are once swung past their middle position, they will be automatically locked, this being a feature of great importance as providing a safe guard for the vehicle and its passengers. Any slipping of the operator's foot from the clutch pedal or brake pedal, under such circumstances, will have absolutely no result upon the stopping of the vehicle and practically all likelihood of injury is thereby prevented. At the same time, the location of the release member 35 in such a position that it can be operated by that heel of the operator's foot resting upon the service brake pedal, is of great importance as it permits the driver to, at all times, keep one foot upon the clutch pedal and one upon the service brake pedal.

Although I have described and illustrated my invention in connection with a Ford type of transmission, it will be understood that I do not wish in any way to limit myself to its application to any specific type of transmission or control mechanism. For instance, my appliance will be found nearly as valuable upon all self-propelled vehicles having clutch and service brake pedals, as locking of the service brake pedal on such vehicles is as important as upon Ford automobiles. Furthermore, it is a great convenience to be able to lock the clutch pedal in inoperative position upon a self-propelled vehicle of any type, particularly in coasting down long hills. In addition to this, the provision of means for locking the clutch pedal in inoperative position is of value upon any vehicle as tending to avoid accidents, due to the slipping of the foot of the operator from such pedal while holding it out to permit changing of gears. This lock upon a Ford automobile is of vast importance, in view of the fact that it is releasible by the foot, in that it relieves the operator of the necessity of manipulating the hand lever except in case of extreme emergencies for application of the emergency brake. For this reason, the driver may, at all times, have both hands upon the steering wheel, an advantage which cannot be overestimated.

For the above reasons, I do not wish to be limited to any specific details of construction and manner of application of my invention to a vehicle, as any changes either in construction or method of application in connection with any type of car, may be made without in the slightest degree departing from the spirit of the invention, as set forth in the appended claims.

Having thus described the invention, what is claimed as new is:

1. The combination with a clutch pedal and a service brake pedal, of independent means for automatically locking the clutch pedal in position to hold the clutch in inactive position and for locking the brake pedal in service position, and a member movable to cause successive release of both of said locking means.

2. The combination with a clutch pedal and a service brake pedal, of independent means for automatically locking the clutch pedal in position to hold the clutch in inactive position and for locking the brake pedal in service position and means for successively releasing said locks, said means including independent carriages supporting the locks and movable toward and away from the pedals, one of said carriages being movable to move the other, and a releasing member extending from such carriage.

3. The combination with a combined clutch and gear shift pedal which, in middle position, holds the transmission in neutral position, of a lock for automatically securing such pedal in middle position when swung to such position, and means independent of the pedal for releasing such lock.

4. The combination with swingingly mounted, spring held brake and clutch pedals, of locking plates simultaneously or independently movable across the path of such pedals to automatically lock them in place, and means operable by movement of a single member for releasing both locking plates.

5. The combination with swingingly mounted, spring held brake and clutch pedals, of a supporting bracket, carriages slidably mounted on the bracket, springs tending to draw the carriages in one direction, and locking plates secured to the carriages and held against the sides of the pedals by such springs, whereby movement of the pedals beyond the ends of the locking plates permits them to move into the return path of the pedals.

6. The combination with swingingly mounted, spring held brake and clutch pedals, of a supporting bracket, carriages slidably mounted on the bracket, springs tending to draw the carriages in one direction, and locking plates secured to the carriages and held against the sides of the pedals by such springs, whereby movement of the pedals beyond the ends of the locking plates permits them to move into the return path of the pedals, the pedal engaging end of one of such locking plates having an inclined cam face for engagement with the pedal.

7. The combination with swingingly mounted, spring held brake and clutch pedals, of a supporting bracket, carriages slidably mounted on the bracket, springs tending to draw the carriages in one direction, and locking plates secured to the carriages and held against the sides of the pedals by such springs, whereby movement of the pedals beyond the ends of the locking plates permits them to move into the return path of the pedals, one of said carriages being provided with an extension by means of which it may be moved against its spring, the carriages being so located that after certain movement of such carriage, it will engage against and actuate the other carriage.

8. The combination with swingingly mounted, spring held brake and clutch pedals, of a supporting bracket, carriages slidably mounted on the bracket, springs tending to draw the carriages in one direction, and locking plates secured to the carriages and held against the sides of the pedals by such springs, whereby movement of the pedals beyond the ends of the locking plates permits them to move into the return path of the pedals, the locking plate for one of the pedals being adjustable toward and away from the bracket to vary the point at which it will lock such pedal.

9. The combination with swingingly mounted, spring held brake and clutch pedals, of a supporting bracket, carriages slidably mounted on the bracket, springs tending to draw the carriages in one direction, and locking plates secured to the carriages and held against the sides of the pedals by such springs, whereby movement of the pedals beyond the ends of the locking plates permits them to move into the return path of the pedals, the locking plate for one of the pedals being adjustable toward and away from the bracket to vary the point at which it will lock such pedal, said adjustment being permitted by a bolt and slot engagement with the bracket, the slotted end of the plate being tapered in thickness to prevent slippage of the bolt.

In testimony whereof I affix my signature in presence of two witnesses.

HENRY J. LYMAN. [L. S.]

Witnesses:
 HOWARD DOWN,
 RAY A. MORRELL.